US010834091B2

(12) United States Patent
Deninno et al.

(10) Patent No.: US 10,834,091 B2
(45) Date of Patent: Nov. 10, 2020

(54) SYSTEMS AND METHODS FOR ROLE-BASED COMPUTER SECURITY CONFIGURATIONS

(71) Applicant: Ivanti, Inc., South Jordan, UT (US)

(72) Inventors: Randy Deninno, Rogers, MN (US); Mark Robert Tempel, Minneapolis, MN (US); Travis Peters, South Jordan, UT (US); Robert M. Juncker, Farmington, MN (US)

(73) Assignee: Ivanti, Inc., South Jordan, UT (US)

( * ) Notice: Subject to any disclaimer, the term of this patent is extended or adjusted under 35 U.S.C. 154(b) by 272 days.

(21) Appl. No.: 15/906,573

(22) Filed: Feb. 27, 2018

(65) Prior Publication Data
US 2018/0248889 A1    Aug. 30, 2018

Related U.S. Application Data

(60) Provisional application No. 62/464,222, filed on Feb. 27, 2017.

(51) Int. Cl.
*H04L 29/06* (2006.01)
*G06F 21/62* (2013.01)
(Continued)

(52) U.S. Cl.
CPC ......... *H04L 63/105* (2013.01); *G06F 21/316* (2013.01); *G06F 21/552* (2013.01);
(Continued)

(58) Field of Classification Search
CPC ..... H04L 41/08; H04L 41/0803; H04L 63/20; H04L 63/10; H04L 63/102; G06F 21/50; G06F 21/62; G06F 2221/2141
See application file for complete search history.

(56) References Cited

U.S. PATENT DOCUMENTS 8,600,995 B1 * 12/2013 Satish ............... G06Q 10/06
707/737
8,972,325 B2 * 3/2015 Varghese ............ G06N 20/00
706/47

(Continued)

OTHER PUBLICATIONS

International Search Report and Written Opinion for International Application No. PCT/US2018/019936, dated Apr. 18, 2018, 12 pages.
(Continued)

*Primary Examiner* — Khang Do

(57) ABSTRACT

An apparatus includes a processor operatively coupled to a memory. The processor detects a software application installed on a client computing device, and/or usage data. Detected usage data is associated with a current user of the client computing device and with the software application. The processor identifies a user role for the current user based on the software application and/or usage data. The processor applies a security configuration to the client computing device based on the user role. The security configuration limits access by the current user to a portion of the software application. The processor sends an identifier of the user role to an administrative server for storage in an Active Directory (AD) database.

24 Claims, 8 Drawing Sheets

(51) Int. Cl.
*G06F 21/55* (2013.01)
*G06F 21/31* (2013.01)
*G06F 21/60* (2013.01)

(52) U.S. Cl.
CPC .......... *G06F 21/604* (2013.01); *G06F 21/629* (2013.01); *H04L 63/10* (2013.01); *H04L 63/101* (2013.01); *H04L 63/102* (2013.01); *H04L 63/20* (2013.01); *G06F 2221/033* (2013.01); *G06F 2221/2141* (2013.01)

(56) References Cited

U.S. PATENT DOCUMENTS

| | | | |
|---|---|---|---|
| 10,454,934 B2* | 10/2019 | Parimi | G06N 5/025 |
| 2005/0120242 A1* | 6/2005 | Mayer | G06F 21/56 726/4 |
| 2006/0015450 A1* | 1/2006 | Guck | G06Q 20/10 705/39 |
| 2006/0149738 A1* | 7/2006 | Muralidharan | G06F 21/55 |
| 2007/0004386 A1* | 1/2007 | Singh | H04W 12/08 455/414.1 |
| 2007/0043716 A1* | 2/2007 | Blewer | G06F 21/604 |
| 2009/0293121 A1 | 11/2009 | Bigus et al. | |
| 2009/0300711 A1* | 12/2009 | Tokutani | G06F 21/554 726/1 |
| 2010/0094991 A1* | 4/2010 | Parikh | G06F 11/3409 709/224 |
| 2010/0257580 A1* | 10/2010 | Zhao | H04L 43/00 726/1 |
| 2012/0246098 A1* | 9/2012 | Chari | G06N 20/00 706/12 |
| 2012/0311672 A1* | 12/2012 | Connor | G06F 21/604 726/4 |
| 2013/0254833 A1 | 9/2013 | Nicodemus et al. | |
| 2013/0283283 A1* | 10/2013 | Wang | G06F 9/46 718/102 |
| 2013/0298184 A1* | 11/2013 | Ermagan | H04L 63/20 726/1 |
| 2014/0109168 A1* | 4/2014 | Ashley | G06F 21/552 726/1 |
| 2014/0164386 A1* | 6/2014 | Baldwin | G06F 8/61 707/740 |
| 2014/0245376 A1 | 8/2014 | Hibbert et al. | |
| 2015/0113614 A1* | 4/2015 | Sarkuni | H04L 63/08 726/5 |
| 2016/0057150 A1* | 2/2016 | Choi | H04L 63/102 726/1 |
| 2016/0306965 A1 | 10/2016 | Iyer et al. | |
| 2017/0126741 A1* | 5/2017 | Lang | G06F 21/57 |
| 2018/0041536 A1* | 2/2018 | Berlin | G06N 3/04 |
| 2018/0174060 A1* | 6/2018 | Velez-Rojas | G06F 3/013 |

OTHER PUBLICATIONS

International Search Report and Written Opinion for International Application No. PCT/US2018/019940, dated Apr. 17, 2018, 11 pages.

Tanium, Inc., Tanium Architecture, Data Sheet, "Tanium's patented endpoint communications architecture provides 15-second visibility and control across every endpoint on the network, and can easily scale to millions of endpoints without requiring ongoing infrastructure additions." 2015, 2 pages.

* cited by examiner

SYSTEMS AND METHODS FOR ROLE-BASED COMPUTER SECURITY CONFIGURATIONS

CROSS-REFERENCE TO RELATED APPLICATIONS

This application claims the benefit of U.S. Provisional Patent Application No. 62/464,222, filed Feb. 27, 2017 and titled "Systems and Methods to Determine User Roles," the entirety of which is incorporated by reference herein in its entirety.

TECHNICAL FIELD

The present disclosure generally relates to computers and computer-related technology. More specifically, the present disclosure relates to systems and methods to determine computer security configurations based on user roles.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, to make such computers useful and accessible to an end user. Computers are increasingly linked with other computers through networks. With the expansion of computer technology, the size of networks has continued to increase. Networks may link computers together that are a great distance apart.

Computer security is important to maintain a safe and productive network. Part of computer security is determining what type of user an individual is. Accordingly, benefits may be realized with systems and methods to determine behavior norms for users, for example based on software characteristics and tagging.

SUMMARY

An apparatus includes a processor operatively coupled to a memory. The processor detects a software application installed on a client computing device and/or usage data. Detected usage data is associated with a current user of the client computing device and with the software application. The processor identifies a user role for the current user based on the software application and/or the usage data. The processor applies a security configuration to the client computing device based on the user role. The security configuration limits access by the current user to a portion of the software application. The processor sends an identifier of the user role to an administrative server for storage in an Active Directory (AD) database.

DETAILED DESCRIPTION

Figure 1A:
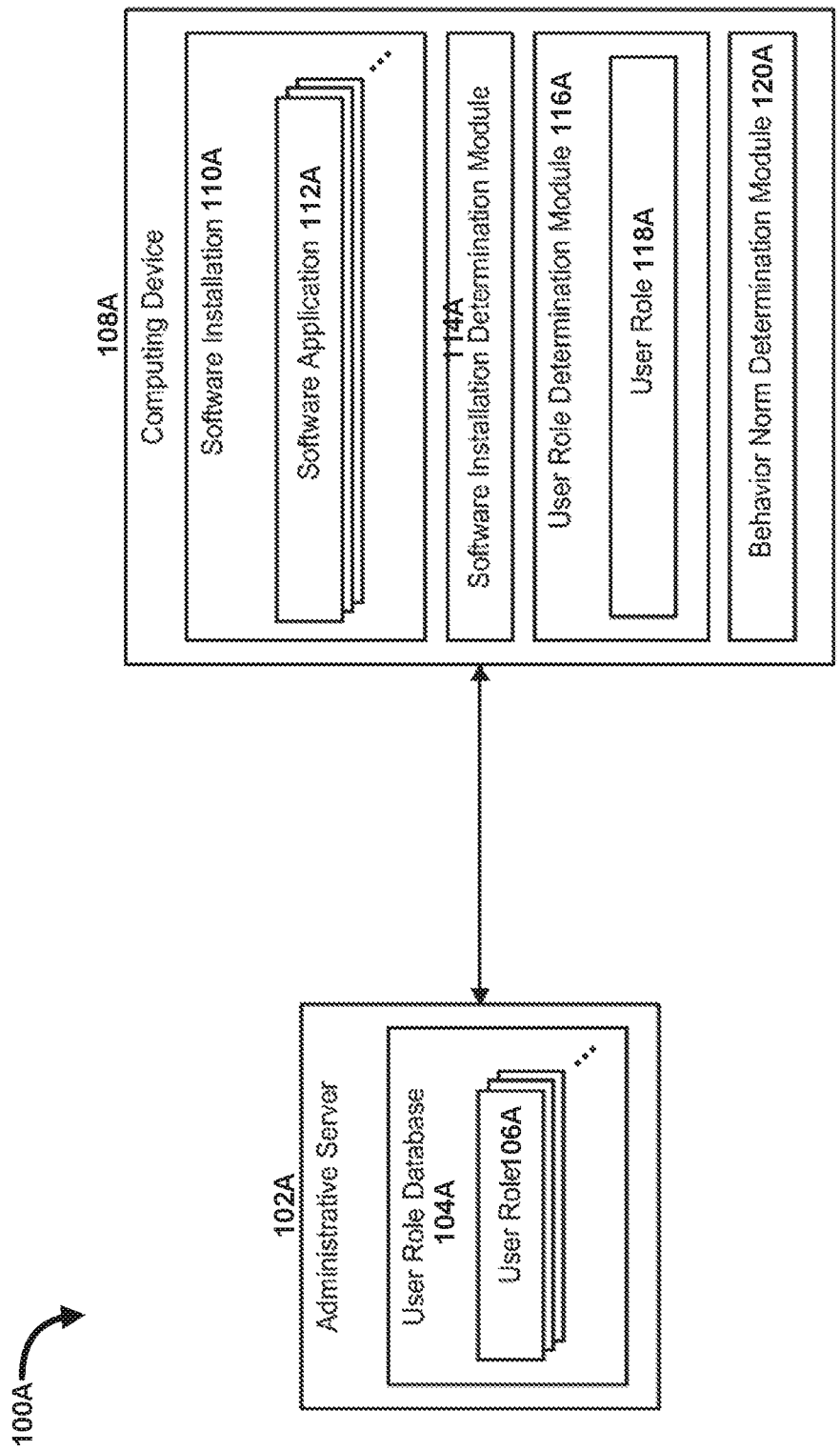
FIG. 1A is a block diagram illustrating a networked system for user behavior determination and computer security implementation, according to an embodiment.

In some embodiments, an apparatus includes a processor operatively coupled to a memory. The processor and the memory can be at a client computing device or at an administrative server. The processor detects a software application installed on the client computing device and/or usage data. The processor can detect the usage data, for example, based on a software usage log or by monitoring software use of a current user of the client computing device over a predetermined period of time. Detected usage data is associated with a current user of the client computing device and with the software application. The processor identifies a user role for the current user based on the software application and/or usage data. The processor applies a security configuration to the client computing device based on the user role. The security configuration limits access by the current user to a portion of the software application. The processor can apply the security configuration, for example, by sending a signal encoding an instruction to implement the security configuration to the client computing device, or by implementing the security configuration at the client computing device. In some implementations, the processor can also receive, from a server, a signal encoding an instruction to implement the security configuration to the client computing device. The processor can send an identifier of the user role to an administrative server for storage in an Active Directory (AD) database. The processor can also identify an expected behavior of the current user of the client computing device based on the current user's user role.

In some embodiments, the processor can also detect a behavior of the current user of the client computing device that deviates from an expected behavior of the current user of the client computing device. In response to detecting the deviation in behavior, the processor can send an alert to the administrative server. In other embodiments, the user role is a first user role, and the processor can also monitor software use of the current user of the client computing device over a predetermined period of time. The processor then identifies a second user role, different from the first user role, based on the monitored software use. In other embodiments, the processor can also identify a security risk for the current user of the client computing device based on the user role and the usage data.

In some embodiments, an apparatus includes a processor operatively coupled to a memory. The processor identifies a software application installed on a client computing device and/or usage data. The processor can identify the usage data, for example, based on a software usage log or by monitoring software use of a current user of the client computing device over a predetermined period of time. Identified usage data is associated with a current user of the client computing device and with the software application. The usage data can include a frequency of use of the software application, a frequency of use of a feature of the software application, a frequency of attempts to use a blocked feature of the software application, a set of accessed features of the software application, and/or a quantity of remote accesses of a desktop of the client computing device. The processor identifies a user role for the current user based on the software application and/or usage data. The processor predicts an expected behavior of the current user of the client computing device based on the user role. The processor modifies a privilege level for the current user at the client computing device based on the expected behavior of the current user. The privilege level is associated with the software application. The processor sends an identifier of the user role to an administrative server for storage in an Active Directory (AD) database.

In some implementations, the software application is a first software application, and the processor also identifies a second software application installed on the client computing device. The processor then identifies the user role for the current user based on an association, stored within the memory, between the first software application, the second software application, and the identifier of the user role.

In some embodiments, a method includes identifying a software application installed on the client computing device and/or usage data at a client computing device. The usage data can be identified, for example, based on a software usage log or by generating the usage data by monitoring software use of a current user of the client computing device over a predetermined period of time. Identified usage data is associated with a current user of the client computing device and with the software application. The method also includes identifying a user role for the current user based on the software application or the usage data. The method also includes identifying an expected behavior of the current user based on the user role. The method also includes applying a device control policy at the client computing device based on the expected behavior of the current user. The device control policy defines an authorized device that the current user of the client computing device can access when the authorized device is operatively coupled (e.g., wirelessly coupled) to the client computing device. The authorized device can be at least one of: a universal serial bus (USB) device, a floppy drive, a compact disc (CD) drive, a printer, a camera, a microphone, a computer mouse, a keyboard, a speaker and/or the like. The method also includes sending the identified user role to an administrative server. The method can also include associating a user record stored in the memory with the identified user role.

In some implementations, identifying the user role includes sending a signal encoding a query to the administrative server and receiving a response to the query from the administrative server. The query can include an indicator of the software application and the usage data. The response can include an indicator of the user role for the current user of the client computing device.

In some embodiments, identifying the usage data includes sending a signal encoding a query to the administrative server and receiving a response to the query from the administrative server. The query can include an indicator of the current user, an indicator of the client computing device, and/or an indicator of the software application. The response can include the usage data.

Various configurations of the systems and methods for user behavior determination and computer security implementation are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods, but is merely representative of the various configurations of the systems and methods.

FIG. 1A is a block diagram illustrating a networked system 100A for user behavior determination and computer security implementation, according to an embodiment. The networked system 100A can determine behavior norms for users based upon software characteristics and tagging. The networked system 100A includes a set of electronic devices that are in electronic communication with one another via a network (not shown in FIG. 1A). For example, the networked system 100A may include one or more Local Area Networks (LANs), Wide Area Networks (WANs), Wireless Local Area Networks (WLANs), the Internet, etc. The networked system 100A includes one or more computing devices 108A and at least one administrative server 102A. Each of the one or more computing devices 108A and the at least one administrative server 102A can include an associated processor and memory (not shown in FIG. 1A) in operable communication with the respective processor.

The computing device 108A can communicate with administrative server 102A of the networked system 100A via the network (not shown in FIG. 1A). The computing device 108A can be physically located in a location that is geographically remote from the administrative server 102A. In an implementation, the administrative server 102A is a cloud-based server that is accessible, for example, via an Internet connection. Alternatively, the administrative server 102A can be physically co-located with the one or more computing devices 108A. In some implementations, the administrative server 102A is a domain controller.

Depending on the implementation, the one or more computing devices 108A can include a server, a desktop computer, a laptop computer, a tablet computer, a smartphone, a router, a printer, etc. In an implementation, the one or more computing devices 108A is a mobile device (e.g., laptop computer, smartphone, tablet computer, etc.) that is configured to join multiple different networks.

The processor of the administrative server 102A and/or the computing device 108A can be, for example, a hardware based integrated circuit (IC) or any other suitable processing device configured to run and/or execute a set of instructions or code. For example, the processor of the administrative server 102A and/or the computing device 108A can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor of the administrative server 102A and/or of the computing device 108A is operatively coupled to a memory through a system bus (for example, address bus, data bus and/or control bus).

The computing device 108A can include a software installation determination module 114A, a user role determination module 116A, one or more software applications 112A of a software installation 110A, and a behavior norm determination module 120A. Each of the software installation determination module 114A, the user role determination module 116A, the software application(s) 112A, and the behavior norm determination module 120A can be software stored in memory (e.g., volatile storage or non-volatile storage, such as a hard drive) and executed by a processor of the computing device 108A (e.g., code to cause the processor of the computing device 108A to execute the software installation determination module 114A, the user role determination module 116A, and the behavior norm determination module 120A can be stored in the memory) and/or a hardware-based device such as, for example, an ASIC, an FPGA, a CPLD, a PLA, a PLC and/or the like. The software installation 110A includes a collection or set of the software applications 112A stored in memory.

Computer security is important to protect the one or more computing devices 108A, the one or more administrative servers 102A, and the network to which the one or more computing devices 108A and the one or more administrative servers 102A are connected. Computer security may also be referred to as "cyber security" or information technology (IT) security. Computer security includes controlling access to the hardware and software of the one or more computing devices 108A. Computer security also includes protecting a network against harm that may come via vulnerabilities in network access, data and code (e.g., compromised software applications).

Computer security is becoming increasingly important as more and more computing devices are connected over one or more networks. For example, as society comes to rely on sophisticated computing systems and the Internet, computing devices may be exploited by malicious entities to compromise privileged information. This problem is especially important with the use of wireless networks (e.g., Bluetooth®, Wi-Fi®, cellular) and the growth of "smart" devices (e.g., smartphones, televisions and devices that are part of the Internet of Things).

Part of computer security is determining what type of user an individual is. Determining a type of user may include determining one or more roles for a user of a computing device. Upon determining the role of a user, security behavior or patterns for that user may be administered centrally.

In certain implementations, the role of a user may be determined based on looking at Active Directory Groups. For example, a user may be included in one or more Active Directory Groups. In another implementation, the role of a user may be determined based on looking at their permissions levels. For example, a user with administrative privileges may be determined to be an administrator. These implementations may, however, be too rigid. For example, Active Directory Groups may not be sufficient to define the actual roles of users in an organization. Additionally, permission levels may not provide enough resolution to distinguish between different types of users. Moreover, these approaches broadly apply rules against users irrespective of their role. For example, a user may be subject to administrative rules that fail to take into account the needs of that user's particular role. For example, a user in a finance role may use different software resources and/or network resources than a user in an information technology (IT) administrator role.

Systems and methods described herein (e.g., the networked systems 100A and 100B) apply a user-oriented approach to computer security, such that the behavior and needs of individual users can be determined, instead of broadly applying security practices in ways that constrict behavior. In some implementations, a user's identity and/or role can be identified based on their software usage. A user can then be "tagged into" (or associated with) a group and/or role that can be used for determining applicable security behavior or behavior patterns that can to be administered centrally.

In some implementations, a user role can be identified, determined and/or detected based on one or more identifiers of software applications that are installed on the user's computing device. Based on the determined role, the user's behavioral norms can be inferred. For example, the networked system 100A may detect that a computing device of a user has Microsoft Visual Studio installed. Based on the detection of Microsoft Visual Studio, the networked system 100A can associate the user with a "developer" role (e.g., by reference to a table in memory of the computing device 108A and/or of the administrative server 102A).

As a second example, the networked system 100A may detect that a computing device of a user has Microsoft Visual Test Suite installed. Based on the detection of Microsoft Visual Test Suite, the networked system 100A can associate the user with a quality assurance (QA) technician role or a "Tester" role. As a third example, the networked system 100A may detect that a computing device of a user has Active Directory Tools installed. Based on the detection of Active Directory Tools, the networked system 100A can associate the user with an IT Administrator role. As a fourth example, the networked system 100A may detect that a computing device of a user has Microsoft Excel and Outlook with no-additional Microsoft Office Suite tools installed. Based on such a detection, the networked system 100A can associate the user with a Finance role.

Software "tagging" (e.g., the association of a user with one or more roles), as described herein, can facilitate the defining of and/or creation of heuristic role inferences based on a user's software installation (e.g., a collection or set of software applications stored in memory). After the one or more roles have been detected/determined, one or more inferences can be made about the user's behavioral norms for operating in the role(s). As an example, a finance user can be determined by the networked system 100A not to have administrative access, or can be prevented from miming a service process on their associated computing device 108A (e.g., by associating the role(s) with one or more security profiles, privilege definitions, etc., for example in records of a database stored in one or both of the computing device 108A and the administrative server 102A). By contrast, a user determined by the networked system 100A to have a research and development role can be associated with a security profile specifying that he/she has administrative access to key/sensitive resources (e.g., via the network or via local memory of the computing device 108A and/or the administrative server 102A).

As shown in FIG. 1A, a computing device 108A includes a software installation determination module 114A. The software installation determination module 114A can determine which software applications a user runs/uses on the computing device 108A. Alternatively or in addition, the software installation determination module 114A can determine which software applications a user has installed on the computing device 108A. Alternatively or in addition, software installation determination module 114A can monitor which software applications a user runs (e.g., over a predetermined period of time). For example, the software installation determination module 114A can monitor software applications use for a user over a period of time. The software installation determination module 114 can log the software application usage, for example in a software usage log. In some implementations, assuming that a first user role determination has been made, a second user role determination can be made for a user based on monitored software use, such that the second user role is different from the first user role (e.g., as the user's role changes).

The computing device 108A also includes a user role determination module 116A that determines one or more roles of a user (user roles 118A) based on the software that the user runs. In an implementation, a processor of the computing device 108A uses the user role determination module 116A to query or analyze a software installation 110A (e.g., including one or more software applications 112A) on the user's computing device 108A, for example to identify identifiers of the one or more software applications 112A. In another implementation, the user role determination module 116A receives a copy of a software usage log, and determines a software usage based on the usage log. The user role determination module 116A can "tag," or associate, a user with one or more user roles 118A (e.g., by including indicators of the user and the one or more assigned role(s) in a common record of a table stored in a memory of the computing device 108A, or by sending a signal encoding the indicators of the user and the assigned role(s) to the administrative server 102A for storage in a memory thereof) based on the software installation and/or the software usage.

Depending on the implementation, certain software applications or combinations of software applications may be mapped to different roles. For example, if the networked system 100A detects that a user has installed or uses an integrated development environment ("IDE") (e.g., Microsoft Visual Studio) on his/her computing device 108A, the user may be mapped to a "developer" role. If the networked system 100A detects that a user has installed or uses a software testing application (e.g., Microsoft Test Manager), the user may be mapped to a QA/tester role. If the networked system 100A detects that a user has installed or uses a directory service tool (e.g., an Active Directory tools), the user may be mapped to an IT administrator role. If the networked system 100A detects that a user has installed or uses a spreadsheet software application (e.g., Microsoft Excel) without one or more other Microsoft Office Suite products, the user may be mapped to a finance role.

The computing device 108A also includes a behavior norm determination module 120A. The behavior norm determination module 120A determines one or more behavioral "norms" (i.e., expected behaviors and/or behavioral patterns associated with the user's usage of one or more software applications on the computing device 108A) of a user based on the determined/detected user role. To determine the one or more behavioral norms, the behavior norm determination module 120A can make "inferences" (e.g., inferences based on machine learning algorithms and/or statistical inferences) about the behavioral norms of the user based on the determined user role. Alternatively or in addition, the behavior norm determination module 120A can predict, e.g., based on the user role for the current user of the client computing device, an expected behavior and/or behavioral pattern of the current user of the client computing device. The behavior norm determination module 120A, when executed by a processor of the computing device 108A, can configure or modify one or more settings of the computing device 108A based on the determined one or more behavioral norms, for example to facilitate a desired functionality of the computing device 108A for that user role.

As an example, when the processor, via the behavior norm determination module 120A, determines the user to be associated with a finance user role, the processor (again via the behavior norm determination module 120A) can configure the computing device 108A to permit access to financial resources (e.g., drives, software) and to prohibit/block administrative access and/or the ability to run a service process for the user on the computing device 108A. By contrast, for a user determined to have a research and development role, the processor (again via the behavior norm determination module 120A) can configure the computing device 108A such that the user has administrative access to one or more key/sensitive network resources (e.g., accessible via the network and/or locally, for example in a memory of the computing device 108A).

In an implementation, a user role that has been determined for a user of a computing device 108A is sent to an administrative server 102A. The administrative server 102A stores the user role, for example in user role records 106A of a user role database 104A. User role records 106A can each include an identifier of one or more roles, an identifier of one or more users, one or more security level indicators, and/or one or more device settings. The user role database 104A can be an Active Directory (AD) database stored in a memory of the networked system 100A (e.g., in a memory of the computing device 108A and/or a memory of the administrative server 102A). In some implementations, the administrative server 102A automatically updates (e.g., upon detection of a received signal encoding identifiers of one or more user roles, and/or according to a predetermined schedule) the user role database to include the received determined user role, for example by modifying a user role field of a record of the user role database to include the determined user role and/or by generating and inserting a new record including the determined user role into the user role database. The administrative server 102A can cause the role records 106A of the user role database 104A to be grouped according to user role. For example, multiple users may be associated with a user role record 106A having a finance user role. Such users may be said to be assigned to a finance user role "group" of the user role database.

Figure 1B:
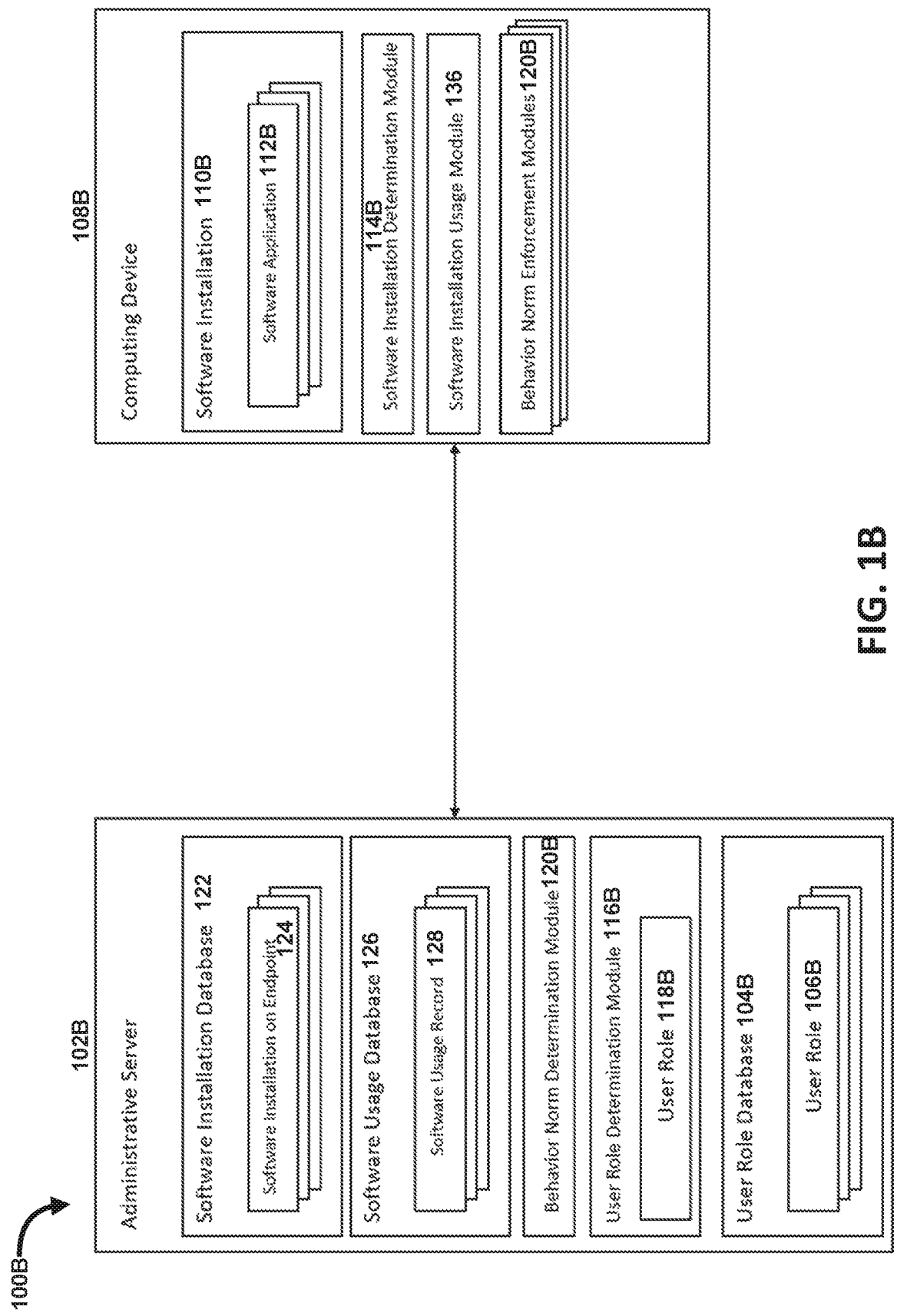
FIG. 1B is a block diagram illustrating a networked system for user behavior determination and computer security implementation, according to another embodiment.

FIG. 1B is a block diagram illustrating a networked system 100B for user behavior determination and computer security implementation, according to another embodiment. As shown in FIG. 1B, an administrative server 102B includes a software installation database 122, a software usage database 126, a behavior norm determination module 120B (e.g., having functionality similar to that of the behavior norm determination module 120A of FIG. 1A), a user role determination module 116B (e.g., having functionality similar to that of the user role determination module 116A of FIG. 1A), and a user role database 104B (e.g., having functionality similar to that of the user role database 104A of FIG. 1A). The software installation database 122 includes a set of software installation records 124 for software applications running/installed on the "endpoint" (e.g., the computing device 108B). The software usage database 126 includes a set of software usage records 128, which may collectively be referred to as a software usage log. The user role determination module 116B includes a user role definition 118B. The user role database 104B includes a set of user role records 106B.

Each of the behavior norm determination module 120B and the user role determination module 116B of administrative server 102B can be software stored in memory and executed by a processor of the administrative server 102B (e.g., code to cause the processor of the administrative server 102B to execute the behavior norm determination module 120B and the user role determination module 116B can be stored in the memory) and/or a hardware-based device such as, for example, an ASIC, an FPGA, a CPLD, a PLA, a PLC and/or the like.

As also shown in FIG. 1B, a computing device 108B includes a software installation 110B (e.g., having functionality similar to that of the software installation 110A of FIG. 1A), a software installation determination module 114B (e.g., having functionality similar to that of the software installation determination module 114A of FIG. 1A), a software installation usage module 136, and one or more behavior norm enforcement modules 120B (e.g., having functionality similar to that of the one or more behavior norm enforcement modules 120A of FIG. 1A). The software installation 110B can include a collection or set of the software applications 112B stored in memory.

Each of the software installation determination module 114B, the software installation usage module 136, the software application(s) 112A, and the one or more behavior norm enforcement modules 120B can be software stored in memory and executed by a processor of the computing device 108B (e.g., code to cause the processor of the computing device 108B to execute the software installation determination module 114B, the software installation usage module 136, and the one or more behavior norm enforcement modules 120B can be stored in the memory) and/or a hardware-based device such as, for example, an ASIC, an FPGA, a CPLD, a PLA, a PLC and/or the like.

In some embodiments, a processor of the computing device 108B, via the one or more behavior norm enforcement modules 120B, can enforce and/or apply an application control policy or configuration on the computing device 108B based on one or more determined user roles, to only permit a user to run software applications that are relevant to or associated with the user role on the computing device 108B. The enforcement and/or application of the application control policy or configuration can be performed automatically. Alternatively, a processor of the administrative server 102B, via the behavior norm enforcement module 120B, can apply an application control policy or configuration by sending a signal to the computing device 108B. The signal can encode an instruction to implement the application control policy or configuration to the computing device 108B based on one or more determined user roles. For example, a user associated with a role of developer or a role of system administrator can be associated with a security policy that allows him/her to run a registry editor to make advanced system modifications, whereas a user associated with a finance role can be associated with a security policy that prevents him/her from launching a registry editor. Similarly, a processor of the computing device 108B can apply restrictions to the computing device 108B, based on determined user role(s), to specify/limit which applications are allowed to run with elevated privileges. For example, a user associated with a role of developer or a role of system administrator can be associated with a security policy that permits him/her to launch an internet browser in "Administrative" mode, whereas a sales person can be associated with a security policy that prevents him/her from launching an internet browser in "Administrative" mode.

In some embodiments, a processor of the computing device 108B, via the one or more behavior norm enforcement modules 120B, can apply, based on one or more determined user roles, a device control policy to the computing device 108B to restrict which physical devices can be used on and/or connected to the computing device 108B. Alternatively, a processor of the administrative server 102B, via the behavior norm enforcement module 120B thereof, can apply a device control policy by sending a signal, based on one or more determined user roles, to the computing device 108B, the signal encoding an instruction to implement a device control policy to the computing device 108B to restrict which physical devices can be used on and/or connected to the computing device 108B. For example, if a user is determined to be a finance user, the processor can prevent the computer from allowing the finance user to write to universal serial bus (USB) devices, but a system administrator can be allowed to write to USB devices. This can be done with any physically or network attached devices including but not limited to: Floppy drives, CD drives, USB drives, printers, cameras, microphones, mice, keyboards, speakers, etc.

In some implementations, a processor of the computing device 108B, via the one or more behavior norm enforcement modules 120B, can send an alert (e.g., to a user of the computing device 108B and/or to the administrative server 102B) when an action or behavior of a user of the computing device 108B deviates from a behavioral norm (or expected behavior) associated with that user and/or that computing device 108B. In other instances, a processor of the administrative server 102B, via the behavior norm enforcement module 120B thereof, can send an alert (e.g., to a user of the administrative server 102B and/or to the computing device 108B) when an action or behavior of a user of the computing device 108B deviates from a behavioral norm. An example of an action or behavior of a user of the computing device 108B deviating from a behavioral norm (or expected behavior) is when a finance user launches a "powershell" or "command line" process, which could indicate an infection risk.

Figure 1C:
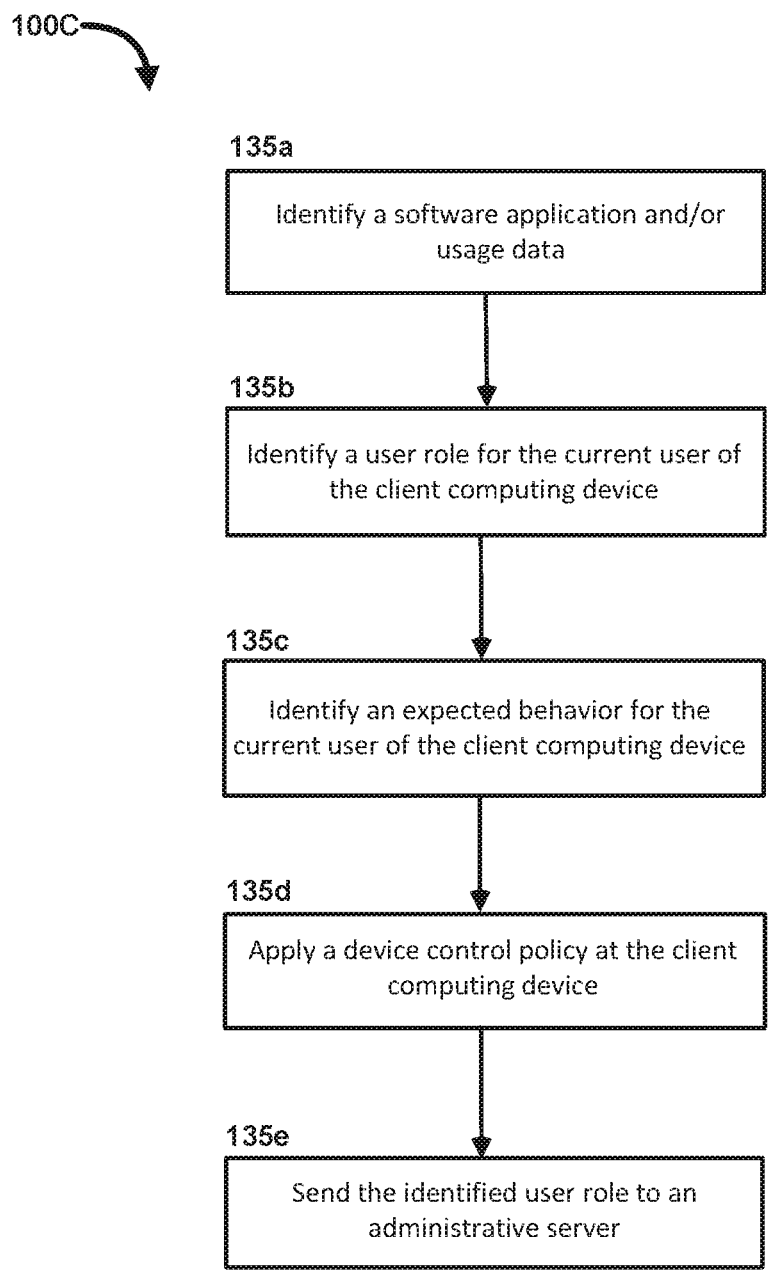
FIG. 1C is a flow diagram illustrating a method for user behavior determination and computer security implementation, according to an embodiment.

FIG. 1C is a process flow diagram illustrating a method 100C for user behavior determination and computer security implementation, implementable by the networked system 100A of FIG. 1A and/or the networked system 100B of FIG. 1B, according to an embodiment. As shown in FIG. 1C, a method 100C includes identifying, at 135a, a software application installed on the client computing device and/or usage data at a client computing device (e.g., 108A or 108B of FIGS. 1A and 1B, respectively). Usage data can include a frequency of use of the software application, a frequency of use of a feature of the software application, a frequency of attempts to use a blocked feature of the software application, a set of accessed features of the software application, a quantity of remote accesses of a desktop of the client computing device, or any combination thereof.

The usage data can be identified, for example, based on a software usage log or by generating the usage data by monitoring software use of a current user of the client computing device over a predetermined period of time. Identified usage data is associated with a current user of the client computing device and/or with the software application. The method 100C also includes identifying, at 135b, a user role for the current user based on the software application or the usage data. The method 100B also includes identifying, at 135c, an expected behavior of the current user based on the user role. In some embodiments, a security risk based on the user role and the usage data for the current user of the client computing device can be identified. When a security risk is identified, one or more mitigation techniques can be selected and/or implemented (e.g., automatically or in response to an administrator's instruction). For example, if usage behavior is detected that deviates from an expected behavior associated with the user role, a privilege level of the current user of the computing device can be adjusted (e.g., to reduce a set of resources that the user can access). The method 100B also includes applying, at 135d, a device control policy at the client computing device based on the expected behavior of the current user. The device control policy can specify one or more authorized devices that the current user of the client computing device is permitted to access when the authorized device is operatively coupled (e.g., wirelessly coupled) to the client computing device. The authorized device can be at least one of: a universal serial bus (USB) device, a floppy drive, a compact disc (CD) drive, a printer, a camera, a microphone, a computer mouse, a keyboard, a speaker and/or the like. The method 100B also includes sending, at 135e, the identified user role to an administrative server (e.g., administrative server 102A or administrative server 102B of FIGS. 1A and 1B, respectively). The method 100B can also include associating a user record stored in a user role database (e.g., a user role 106A of user role database 104A in FIG. 1A or a user role 106B of user role database 104B of FIG. 1B) with the identified user role (not shown).

Systems (such as networked systems 100A and 100B of FIGS. 1 and 2, respectively) and methods (such as method 100C of FIG. 1C, or methods 200, 300, and 400 of FIGS. 2, 3 and 4, respectively) described herein provide a dynamic and automated approach to determine roles of users within an organization. Based on a software installation and/or software usage of a computing device, a user role can be determined. Expected behaviors/behavior patterns and security configurations can be identified based on the user role determination(s), thus providing an individualized, user-oriented approach to computer security.

Table 1A, below, shows an example table of a user role database (e.g., user role database 104A of FIG. 1A and/or user role database 104B of FIG. 1B), showing a "mapping" or association between variables/fields including "executable name" (i.e., an identifier of a software application), a software application name, a machine name (e.g., identifying a computing device such as computing device 108A or computing device 108B of FIGS. 1A and 1B, respectively), user name, an indicator of whether or not the user associated with the user name in the record/row has "elevated privileges" associated with the software application referenced by the software application name in that record/row, and a number of times the software application has been used by the user. Any combination of the foregoing variables can be used by the systems and methods disclosed herein (e.g., using networked system 100A or 100B of FIGS. 1A and 1B, respectively), to determine, identify, or detect a user role (e.g., based on a query performed by a processor of a computing device and/or an administrative server as described herein). Table 1B shows example expected behaviors for users having an administrative role (designated by a "*" in Table 1B and in example associated records of Table 1A), a finance/accounting role (designated by a "" in Table 1B and in example associated records of Table 1A), and a developer role (designated by a "*" in Table 1B and in example associated records of Table 1A).

Example correspondences, within a user role database, between variables/fields and user roles are shown in Table 1A. For example, records (or rows) matching the user name "Mike Miller" include records 42, 43, and 47, indicating executable names of "devenv.env," "vstest.exe," and "git.exe," and associated "number of times used" values (i.e., usage levels) of 156, 368, and 1,358, respectively. Values in the "number of times used" column of Table 1A refer to numbers of times that the software application was launched over a fixed period of time. Record 42 also indicates that "devenv.exe" was used 156 times. The records matching the user name "Mike Miller" also include records 38 and 39, showing that the executables "powershell.exe" and "cmd.exe" have been run with elevated privileges and at frequencies of use of 23 and 86, respectively. The records matching the user name "Mike Miller" also include: records 44, 48, 51, 53 and 55. Record 44 shows that the "notepad++.exe" software was used 97 times. Record 48 shows that the "mstsc.exe" (with a software name of "Remote Desktop") software was used 294 times. Record 51 shows that the "chrome.exe" software was used 2,596 times. Record 53 shows that the "slack.exe" software was used 79 times. Record 55 shows that the "iis.exe" software was used 43 times. Based on the information in the records matching the user name "Mike Miller" and the expected user behaviors of Table 1B, a user role of "Developer" can be identified. For example, according to Table 1B, the following behaviors are expected from a user assigned to a Developer role: (1) running development tools such as DevEnv and vstest (as shown, for user "Mike Miller," at records 42 and 43 of Table 1A); (2) running source control utilities such as git.exe (as shown, for user "Mike Miller," at record 47 of Table 1A); (3) moderate to high remote desktop usage (as shown, for user "Mike Miller," at record 48 of Table 1A); and (4) usage of collaboration tools such as slack.exe (as shown, for user "Mike Miller," at record 53 of Table 1A). Although shown and described with reference to particular combinations of and values for variables/fields for identifying user roles, other combinations can also or alternatively be used.

Figure 2:
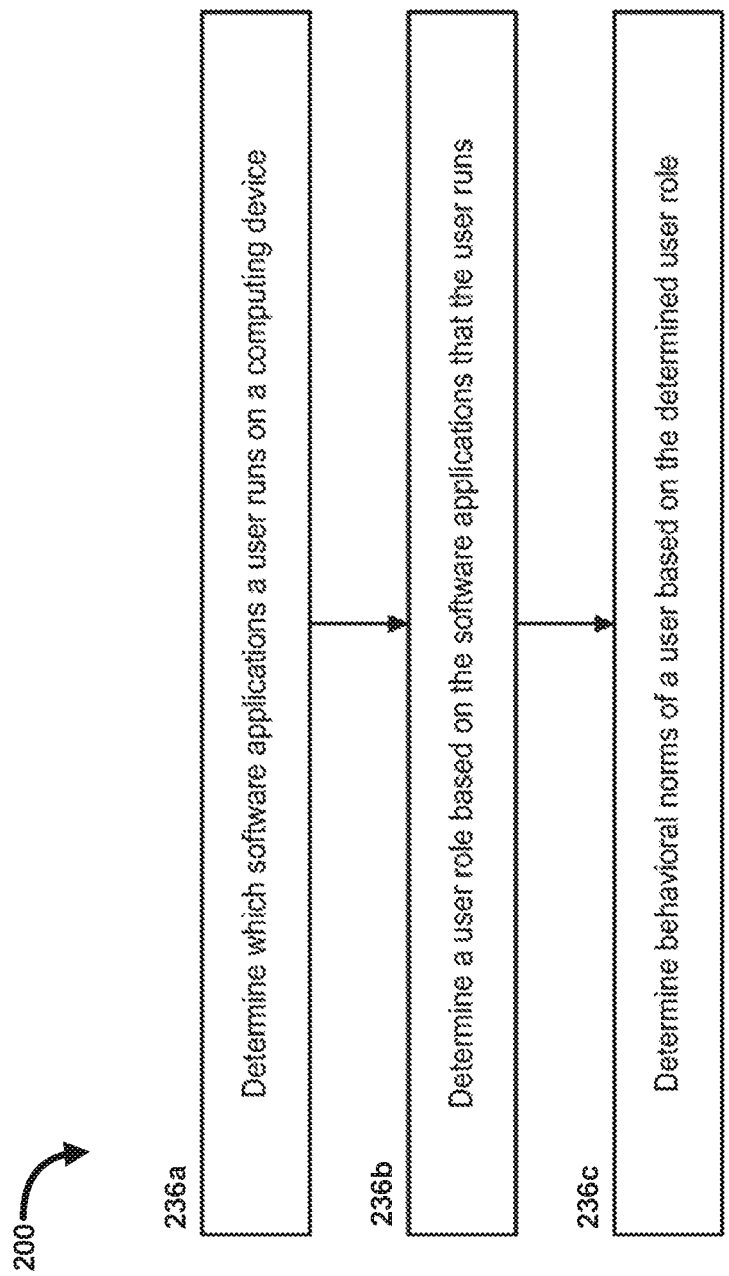
FIG. 2 is a flow diagram illustrating a method for user behavior determination and computer security implementation, according to another embodiment.

FIG. 2 is a flow diagram illustrating a method 200 for user behavior determination and computer security implementation, implementable by the networked system 100A of FIG. 1A and/or the networked system 100B of FIG. 1B, according to another embodiment. The method 200 can be used to determine one or more behavior norms for one or more associated users, for example based upon software characteristics and/or tagging. The method can be implemented by a computing device (e.g., 108A or 108B of FIGS. 1A and 1B, respectively). As shown in FIG. 2, the computing device determines (at 236a) which software applications a user runs on the computing device. For example, the computing device determines which software applications a user runs on the computing device by detecting one or more software applications that are installed on the computing device. In other instances, the computing device can determine which software applications a user runs on the computing device by monitoring and/or detecting which software applications a user runs.

TABLE 1A

Example Table of a User Role Database

| | Executable name | Software Application Name | Machine Name | User | Runs With Elevated Privileges? | Number of Times Used |
|---|---|---|---|---|---|---|
| 1 | excel.exe | Microsoft Excel | dmurph-e600 | Dominique Murphy | No | 50 |
| 2 | powershell.exe* | PowerShell | dmurph-e600 | Dominique Murphy | No* | 128* |
| 3 | cmd.exe* | Command Line Shell | dmurph-e600 | Dominique Murphy | Yes* | 68* |
| 4 | word.exe | Microsoft Word | dmurph-e600 | Dominique Murphy | No | 23 |
| 5 | regedit.exe* | Registry Editor | dmurph-e600 | Dominique Murphy | Yes | 16* |
| 6 | notepad++.exe | Notepad ++ | dmurph-e600 | Dominique Murphy | No | 98 |
| 7 | ssms.exe | SQL Server Management Studio | dmurph-e600 | Dominique Murphy | No | 34 |
| 8 | Outlook.exe | Microsoft outlook | dmurph-e600 | Dominique Murphy | No | 234 |
| 9 | mstsc.exe* | Remote Desktop | dmurph-e600 | Dominique Murphy | No | 432* |
| 10 | adbrowse.exe* | Active Directory Browser | dmurph-e600 | Dominique Murphy | No | 24 |
| 11 | perfmon.exe* | Windows Performance Monitor | dmurph-e600 | Dominique Murphy | No | 55* |
| 12 | onedrive.exe | OneDrive | dmurph-e600 | Dominique Murphy | No | 17 |
| 13 | chrome.exe* | Google Chrome | dmurph-e600 | Dominique Murphy | No | 548* |
| 14 | iexplore.exe | Internet Explorer | dmurph-e600 | Dominique Murphy | No | 34 |
| 15 | slack.exe | Slack Messaging | dmurph-e600 | Dominique Murphy | No | 44 |
| 16 | skypehost.exe | Skype for Windows | dmurph-e600 | Dominique Murphy | No | 26 |
| 17 | powershell.exe* | PowerShell | server1-t5000* | Dominique Murphy | Yes | 12 |
| 18 | cmd.exe* | Command Line Shell | server1-t5000* | Dominique Murphy | Yes | 1 |
| 19 | regedit.exe | Registry Editor | server1-t5000 | Dominique Murphy | Yes | 14 |
| 20 | notepad++.exe | Notepad ++ | server1-t5000 | Dominique Murphy | No | 3 |
| 21 | ssms.exe | SQL Server Management Studio | server1-t5000 | Dominique Murphy | No | 2 |
| 22 | chrome.exe | Google Chrome | server1-t5000 | Dominique Murphy | No | 33 |
| 23 | powershell.exe* | PowerShell | server2-t5000* | Dominique Murphy | Yes | 12 |
| 24 | cmd.exe* | Command Line Shell | server2-t5000* | Dominique Murphy | Yes | 7 |
| 25 | regedit.exe* | Registry Editor | server2-t5000* | Dominique Murphy | Yes | 3 |
| 26 | notepad++.exe | Notepad ++ | server2-t5000 | Dominique Murphy | No | 2 |
| 27 | chrome.exe | Google Chrome | server2-t5000 | Dominique Murphy | No | 4 |
| 28 | excel.exe | Microsoft Excel | nsmith-e300 | Nancy Smith | No | 356 |
| 29 | word.exe | Microsoft Word | nsmith-e300 | Nancy Smith | No | 243 |
| 30 | quickbooks.exe** | Quick Books Pro | nsmith-e300 | Nancy Smith | No | 67** |
| 31 | sap.exe** | SAP | nsmith-e300 | Nancy Smith | No | 158** |
| 32 | sagefas.exe** | Sage Fixed Asset | nsmith-e300 | Nancy Smith | No | 38** |
| 33 | Outlook.exe | Microsoft outlook | nsmith-e300 | Nancy Smith | No | 125 |
| 34 | onedrive.exe | OneDrive | nsmith-e300 | Nancy Smith | No | 21 |
| 35 | iexplore.exe** | Internet Explorer | nsmith-e300 | Nancy Smith | No | 473** |
| 36 | skypehost.exe** | Skype for Windows | nsmith-e300 | Nancy Smith | No | 84** |
| 37 | excel.exe | Microsoft Excel | mmiller-e1000 | Mike Miller | No | 41 |
| 38 | powershell.exe*** | PowerShell | mmiller-e1000 | Mike Miller | Yes*** | 23*** |
| 39 | cmd.exe*** | Command Line Shell | mmiller-e1000 | Mike Miller | Yes*** | 86*** |
| 40 | word.exe | Microsoft Word | mmiller-e1000 | Mike Miller | No | 44 |
| 41 | regedit.exe | Registry Editor | mmiller-e1000 | Mike Miller | Yes | 6 |
| 42 | devenv.exe*** | MS Visual Studio | mmiller-e1000 | Mike Miller | Yes*** | 156*** |
| 43 | vstest.exe*** | Visual studio test engine | mmiller-e1000 | Mike Miller | No*** | 368*** |
| 44 | notepad++.exe*** | Notepad ++ | mmiller-e1000 | Mike Miller | No | 97*** |
| 45 | ssms.exe | SQL Server Management Studio | mmiller-e1000 | Mike Miller | No | 64 |
| 46 | Outlook.exe | Microsoft outlook | mmiller-e1000 | Mike Miller | No | 259 |
| 47 | git.exe*** | Git for Windows | mmiller-e1000 | Mike Miller | No | 1358*** |
| 48 | mstsc.exe*** | Remote Desktop | mmiller-e1000 | Mike Miller | No | 294*** |
| 49 | perfmon.exe | Windows Performance Monitor | mmiller-e1000 | Mike Miller | No | 3 |
| 50 | onedrive.exe | OneDrive | mmiller-e1000 | Mike Miller | No | 38 |
| 51 | chrome.exe*** | Google Chrome | mmiller-e1000 | Mike Miller | No | 2596*** |
| 52 | iexplore.exe | Internet Explorer | mmiller-e1000 | Mike Miller | No | 689 |
| 53 | slack.exe*** | Slack Messaging | mmiller-e1000 | Mike Miller | No | 79*** |
| 54 | skypehost.exe | Skype for Windows | mmiller-e1000 | Mike Miller | No | 56 |
| 55 | iis.exe*** | IIS Management.Console | webserv-w200 | Mike Miller | No | 43*** |

TABLE 1B

Example Expected User Behaviors

| Admin Indicators (*) | Finance/Accounting Indicators () | Developer Indicators (*) |
|---|---|---|
| Running shell tools | Accounting Applications being run with high frequency | Running Development Tools such as DevEnv, vstest, etc |
| Running advanced system tooling (regedit, perfmon, etc.) | Using built-in browser and communications tools | Running Test Tools |

TABLE 1B-continued

Example Expected User Behaviors

| Admin Indicators (*) | Finance/Accounting Indicators () | Developer Indicators (*) |
|---|---|---|
| Using remote desktop with high frequency | No or very low usage of system admin tools | Running source control utilities (git.exe, etc) |
| Using a not built-in browser | No or very low developer tooling usage | Moderate to high remote desktop usage |
| Running processes on servers | | Moderate usage of server usage for web tooling |
| Running processes with elevated priv. | | Low-Moderate frequency of system admin tools used |
| Not running primary dev tools | | Using advanced collaboration tools (slack.exe) |
| Not running software test tools | | |

The computing device determines, at 236b, a user role based on the software applications that the user runs. For example, a processor of the computing device, via the role determination module, can analyze or query a software installation on the user's computing device to identify one or more software applications and compare the identified one or more software applications with a user role database. Alternatively or in addition, the processor can, via the role determination module, analyze and/or query a software usage log, received by and/or stored within the computing device, to identify a user's software usage behavior. The processor can, via the user role determination module, "tag" or associate a user with a user role based on the software installation and/or the software usage behavior. As discussed above, certain software applications or combinations of software applications can be mapped to certain roles.

At 236c, the computing device determines one or more behavioral norms of a user based on the determined user role. For example, the computing device may detect one or more user behaviors and/or behavior patterns for which centralized control is desirable (e.g., via a policy implemented at an administrative server in network communication with the computing device). The computing device can also send the user role information to an administrative server. The administrative server can store a user role directory that includes multiple different role records associated with multiple different roles. Users can be associated with the different roles within the role records. In some implementations, the user role directory is an Active Directory.

Figure 3:
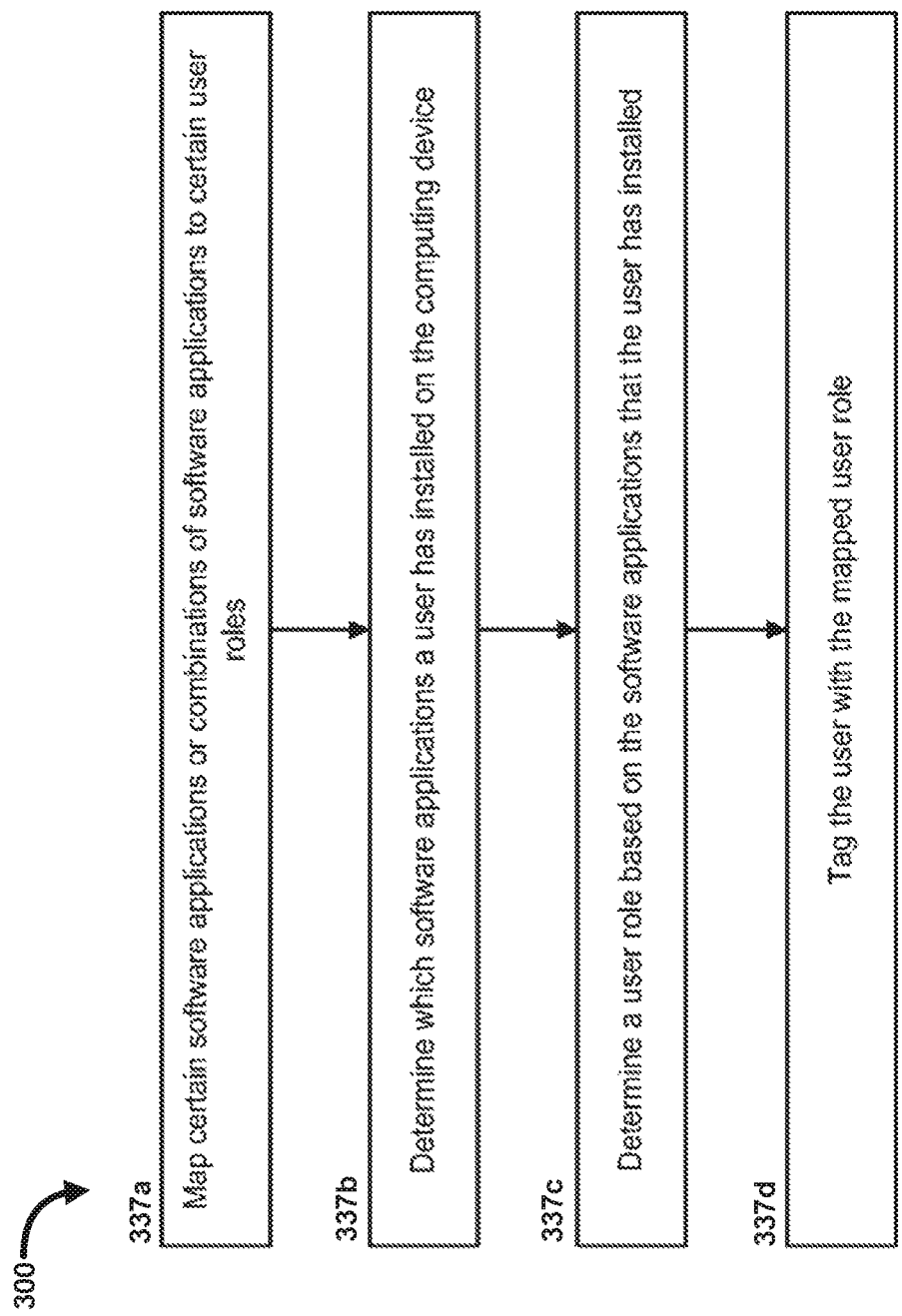
FIG. 3 is a flow diagram illustrating a method for user role determination, according to another embodiment.

FIG. 3 is a flow diagram illustrating a method 300 for user role determination, implementable by the networked system 100A of FIG. 1A and/or the networked system 100B of FIG. 1B, according to another embodiment. The method can be implemented by a processor of a computing device (e.g., 108A or 108B of FIGS. 1A and 1B, respectively). As shown in FIG. 3, the computing device maps, at 337a, software applications or combinations of software applications to certain user roles. For example, use and/or installation of a first set of one or more software applications may indicate a first user role, while use and/or installation of a second set of one or more software applications may indicate a second user role. At 337b, the computing device determines which software applications a user has installed on the computing device. At 337c, the computing device determines a user role based on the software applications that the user has installed. For example, a processor of the computing device may compare the software applications that the user has installed with a software mapping (e.g., stored in a memory of the computing device or in an administrative server in operable network communication with the computing device) to identify one or more user roles to which the user is assigned, or with which the user is associated. At 337d, the computing device "tags," or associates, the user with the identified one or more user roles. The tagging of a user at 337d is performed automatically in some embodiments. Although shown and described as being implemented by a computing device, the method 300 can also be implemented on an administrative server, or via a collaboration between a computing device and an administrative server in communication with one another over a network. Although FIG. 3 illustrates an association of a user with a user role based on currently-installed software applications (e.g., at a given time), it is also possible to associate users with user roles in response to active monitoring of the software applications that are used by the user over time, as shown and described with reference to FIG. 4.

Figure 4:
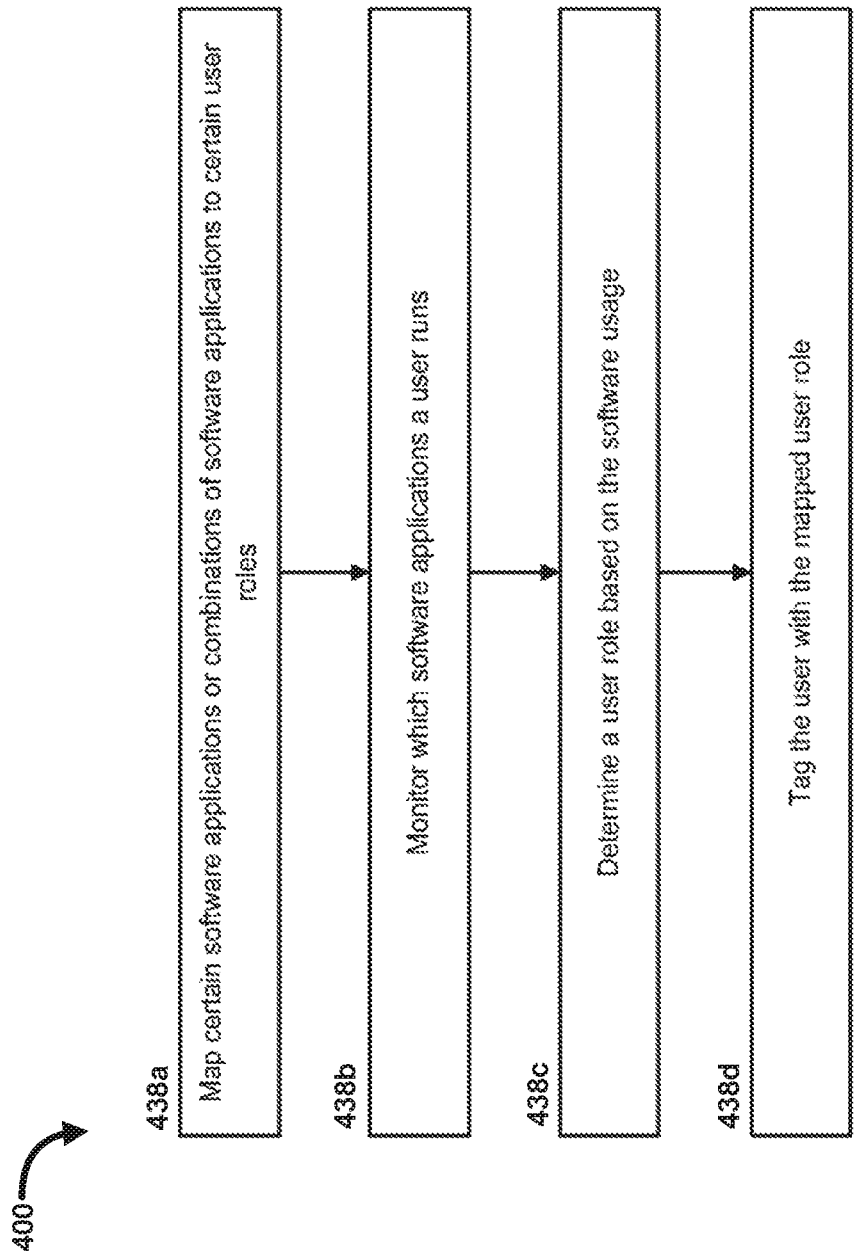
FIG. 4 is a flow diagram illustrating a method for user behavior determination and computer security implementation, according to an embodiment.

FIG. 4 is a flow diagram illustrating a method 400 for user role determination, implementable by the networked system 100A of FIG. 1A and/or the networked system 100B of FIG. 1B, according to an embodiment. The method can be implemented by a computing device (e.g., 108A or 108B of FIGS. 1A and 1B, respectively). As shown in FIG. 4, the computing device maps, or associates, at 438a, multiple software applications and/or combinations of software applications to one or more user roles. For example, use and/or installation of a first set of one or more software applications may indicate a first user role, while use and/or installation of a second set of one or more software applications may indicate a second user role. At 438b, the computing device monitors which software applications a user runs (e.g., "software usage"). For example, the computing device may monitor which software applications are used by the user over a predetermined period of time. The computing device can log this software application usage in a software usage log. At 438c, the computing device determines one or more user roles based on the software usage. For example, the computing device may determine which software applications the user runs based on the software usage log. Using the software applications identified in the software usage log, the computing device can assess the software mapping to identify the user role to which the user belongs. At 438d, the computing device tags or associates the user with the mapped user role. The tagging of a user at 438d is performed automatically in some embodiments. Although shown and described as being implemented by a computing device, the method 400 can also be implemented on an administrative server, or via a collaboration between a computing device and an administrative server in communication with one another over a network.

Figure 5:
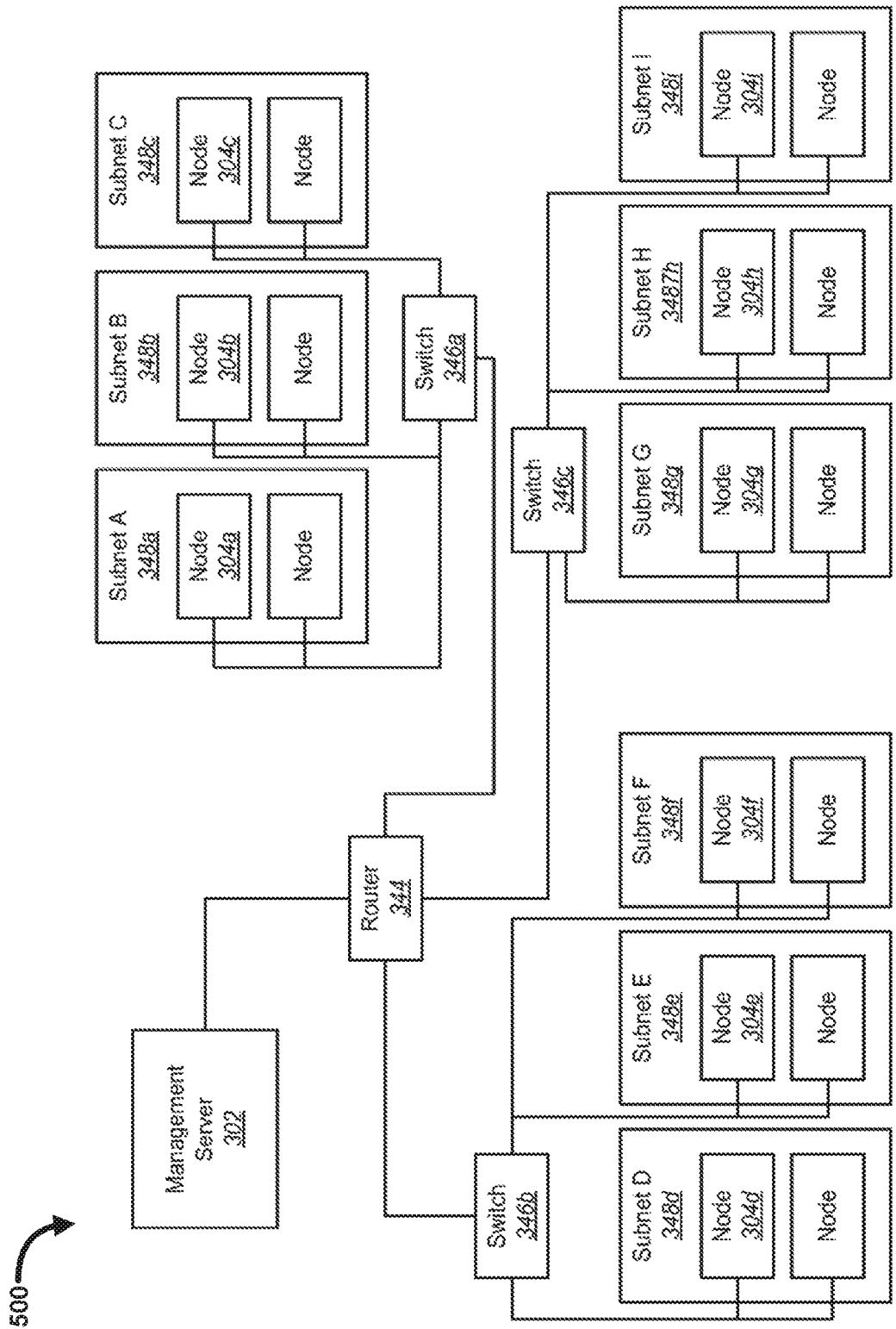
FIG. 5 is a block diagram illustrating a networked system for user behavior determination and computer security implementation, according to an embodiment.

FIG. 5 is a block diagram illustrating a networked system for user behavior determination and computer security implementation, implementable by the networked system 100A of FIG. 1A and/or the networked system 100B of FIG. 1B, according to an embodiment. Using the networked system 500, behavior norms for users can be determined, for example based on software characteristics and/or usage, and tagging can be implemented. As shown in FIG. 5, a management server 302 is connected to a router 344. The router 344 is connected to switches 346a, 346b, and 346c. The switch 346a is connected to several nodes 304a, 304b, 304c, etc., via their respective subnets 348a, 348b, and 348c. The switch 346b is connected to several nodes 304d, 304e, 304f, etc., via their respective subnets 348d, 348e, and 348f. The switch 346c is connected to several nodes 304g, 304h, and 304i, etc., via their respective subnets 348g, 348h and 348i. Subnet I 348i includes one or more nodes 304. Although FIG. 5 only shows one router 344, and a limited number of switches 346, subnets 348 and nodes 304, many and varied numbers of routers 344, switches 346, subnets 348 and nodes 304 can be included in networks and/or systems that may implement systems and methods for context-based privilege mitigation.

Management server 302 may be implemented in accordance with the administrative servers 102A and 102B described in connection with FIGS. 1A and 1B, respectively. Furthermore, the nodes 304 may be examples of one or more of the computing devices 108A and 108B described in connection with FIGS. 1A and 1B, respectively.

Figure 6:
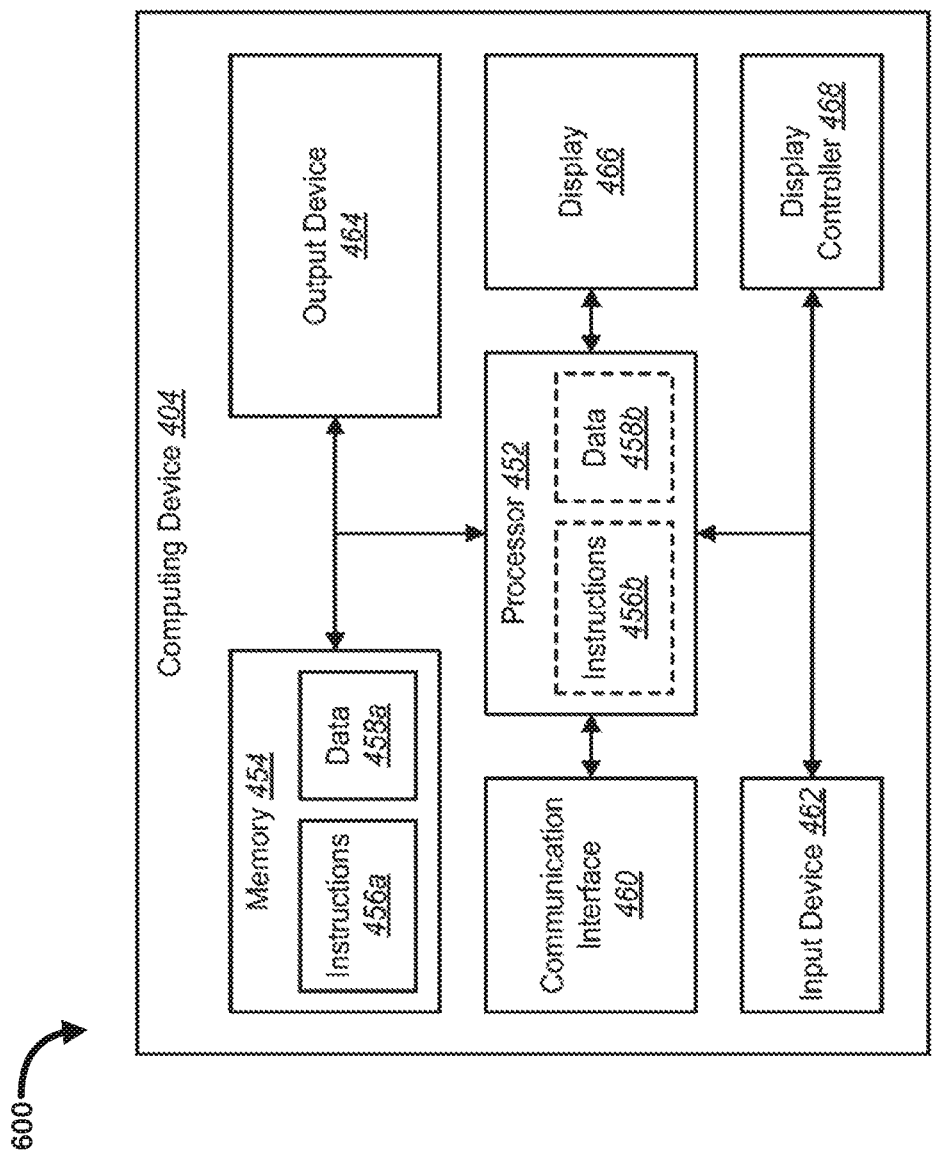
FIG. 6 illustrates a block diagram of a computing device for user behavior determination and computer security implementation, according to an embodiment.

FIG. 6 illustrates a computing device for user behavior determination and computer security implementation, according to an embodiment. The computing device 404 can be implemented in accordance with administrative servers 102A and 102B described in connection with FIGS. 1A and 1B, respectively, and/or the computing devices 108A and 108B described in connection with FIGS. 1A and 1B, respectively. As shown in FIG. 6, the computing device 404 includes a processor 452 and memory 454. The memory 454 includes instructions 456a and data 458a. The processor 452 controls the operation of the computing device 404 and may be, for example, a microprocessor, a microcontroller, a digital signal processor (DSP) or other device known in the art. The processor 452 is configured to perform logical and arithmetic operations based on program instructions 456b and/or data 458b received from the memory 454. For example, the processor 452 can execute one or more modules, such as the software installation determination module 1414A, the user role determination module 116A, and/or the behavior norm determination module 120A of FIG. 1A, and/or the behavior norm determination modules 120B, the user role determination module 116B, the software installation determination module 114B, and/or the software installation usage module 136 of FIG. 1b.

The computing device 404 includes one or more communication interfaces 460 for communicating with other electronic devices. The communication interfaces 460 can be based on wired communication technology, wireless communication technology, or both. Examples of different types of communication interfaces 460 include a serial port, a parallel port, a Universal Serial Bus (USB), an Ethernet adapter, an IEEE bus interface, a small computer system interface (SCSI) bus interface, an infrared (IR) communication port, a Bluetooth® wireless communication adapter and so forth.

The computing device 404 can include one or more input devices 462 and one or more output devices 464. Examples of different kinds of input devices 462 include a keyboard, mouse, microphone, remote control device, button, joystick, trackball, touchpad, lightpen, etc. Examples of different kinds of output devices 464 include a speaker, printer, etc. One specific type of output device that may be included in a computer system is a display device 466. Display devices 466 used with configurations disclosed herein may utilize any suitable image projection technology, such as liquid crystal display (LCD), light-emitting diode (LED), gas plasma, electroluminescence, a cathode ray tube (CRT) or the like.

The computing device 404 also includes a display controller 468 for converting data stored in the memory 454 into text, graphics and/or moving images (as appropriate) shown on the display device 466. FIG. 6 illustrates one example configuration of a computing device 404, and various other architectures and components can also be used.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "automatically" is used herein to modify actions that occur without direct input or prompting by an external source such as a user. Automatically occurring actions can occur periodically, sporadically, in response to a detected event (e.g., a user logging in), or according to a predetermined schedule. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified.

While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. An apparatus, comprising:
   a processor; and
   a memory operatively coupled to the processor, the processor configured to:
   identify at least one of:
   a software application installed on a client computing device, or
   usage data, associated with a current user of the client computing device and for the software application;
   identify, based on the software application installed on the client computing device or the usage data, a user role for the current user of the client computing device;
   predict, based on the user role for the current user of the client computing device, an expected behavior of the current user of the client computing device;
   modify, at the client computing device and based on the expected behavior of the current user of the client computing device, a privilege level of an application control policy for the current user of the client computing device, the privilege level of the application control policy being associated with the software application;
   applying, based on the expected behavior, the application control policy with the modified privilege level at the client computing device, wherein the application of the application control policy permits the user to run the software application based on the modified privilege level and the user role; and
   send an identifier of the user role to an administrative server for storage in an Active Directory (AD) database.

2. The apparatus of claim 1, wherein the processor is further configured to:
- detect a behavior of the current user of the client computing device that deviates from the expected behavior; and
- send an alert to the administrative server in response to detecting the behavior that deviates from the expected behavior.

3. The apparatus of claim 1, wherein:
- the processor and the memory are at the client computing device; or
- the processor and the memory are at the administrative server.

4. The apparatus of claim 1, wherein the processor is further configured to identify a security risk for the current user of the client computing device based on the user role and the usage data.

5. The apparatus of claim 1, wherein the processor is configured to identify the usage data based on a software usage log.

6. The apparatus of claim 1, wherein the processor is configured to identify the usage data by monitoring software usage by the current user of the client computing device over a predetermined period of time.

7. The apparatus of claim 6, wherein:
- the user role is a first user role; and
- the processor is further configured to identify a second user role, different from the first user role, based on the monitored software usage.

8. The apparatus of claim 1, wherein the usage data includes at least one of: a frequency of use of the software application, a frequency of use of a feature of the software application, a frequency of attempts to use a blocked feature of the software application, a set of accessed features of the software application, or a quantity of remote accesses of a desktop of the client computing device.

9. The apparatus of claim 1, wherein:
- the software application is a first software application; and
- the processor is further configured to:
  - identify a second software application installed on the client computing device; and
  - identify the user role for the current user of the client computing device based on an association, stored within the memory, between the first software application, the second software application, and an identifier of the user role.

10. The apparatus of claim 1, wherein the processor is further configured to apply, based on the user role for the current user of the client computing device, a security configuration to the client computing device to limit access by the current user of the client computing device to at least a portion of the software application.

11. A method, comprising:
- identifying, at a client computing device, at least one of:
  - a software application installed on the client computing device, or
  - usage data, associated with a current user of the client computing device and for the software application;
- identifying, based on the software application installed on the client computing device or the usage data, a user role for the current user of the client computing device;
- identifying, based on the user role for the current user of the client computing device, an expected behavior of the current user of the client computing device;
- applying, based on the expected behavior of the current user of the client computing device, a device control policy at the client computing device to define at least one authorized device that the current user of the client computing device can access when the at least one authorized device is operatively coupled to the client computing device; and
- sending the identified user role to an administrative server.

12. The method of claim 11, wherein the at least one authorized device includes at least one of: a universal serial bus (USB) device, a floppy drive, a compact disc (CD) drive, a printer, a camera, a microphone, a computer mouse, a keyboard, or a speaker.

13. The method of claim 11, wherein the device control policy identifies the at least one authorized device that the current user of the client computing device can access when the at least one authorized device is wirelessly connected to the client computing device.

14. The method of claim 11, further comprising associating a user record stored in a memory with the identified user role.

15. The method of claim 11, wherein the identifying the usage data is based on a software usage log.

16. The method of claim 11, wherein the identifying the usage data includes generating the usage data by monitoring software usage by the current user of the client computing device over a predetermined period of time.

17. The method of claim 16, wherein the user role is a first user role, the method further comprising identifying a second user role, different from the first user role, based on monitored software usage.

18. The method of claim 11, wherein the identifying the user role for the current user of the client computing device includes:
- sending a signal encoding a query to the administrative server, the query including an indicator of the at least one software application installed on the client computing device and the usage data, and
- receiving, from the administrative server, a response to the query including an indicator of the user role for the current user of the client computing device.

19. The method of claim 11, wherein the identifying the usage data includes:
- sending a signal encoding a query to the administrative server, the query including an indicator of the current user of the client computing device, an indicator of the client computing device, and an indicator of the software application, and
- receiving, from the administrative server, a response to the query including the usage data for the software application of the at least one software application.

20. The method of claim 11, further comprising:
- detecting a behavior of the current user of the client computing device that deviates from the expected behavior; and
- sending an alert to the administrative server in response to detecting the behavior that deviates from the expected behavior.

21. The method of claim 11, wherein the usage data includes at least one of: a frequency of use of the software application, a frequency of use of a feature of the software application, a frequency of attempts to use a blocked feature of the software application, a set of accessed features of the software application, or a quantity of remote accesses of a desktop of the client computing device.

22. The method of claim 11, further comprising identify a security risk for the current user of the client computing device based on the user role and the usage data.

23. The method of claim 11, further comprising applying, based on the user role for the current user of the client computing device, a security configuration to the client computing device to limit access by the current user of the client computing device to at least a portion of the software application.

24. The method of claim 11, wherein the software application is a first software application, the method further comprising:
- identifying a second software application installed on the client computing device; and
- identifying the user role for the current user of the client computing device based on an association, stored within a memory, between the first software application, the second software application, and an identifier of the user role.

\* \* \* \* \*